(12) United States Patent
Hasler et al.

(10) Patent No.: US 9,337,645 B2
(45) Date of Patent: May 10, 2016

(54) METHOD AND CONTROLLER FOR PROTECTING A VOLTAGE SOURCE CONVERTER

(71) Applicant: ABB Technology AG, Zurich (CH)

(72) Inventors: Jean-Philippe Hasler, Vasteras (SE); Mauro Monge, Vasteras (SE); Marcio De Oliveira, Vasteras (SE)

(73) Assignee: ABB Technology AG, Zurich (CH)

( * ) Notice: Subject to any disclaimer, the term of this patent is extended or adjusted under 35 U.S.C. 154(b) by 167 days.

(21) Appl. No.: 14/142,224

(22) Filed: Dec. 27, 2013

(65) Prior Publication Data

US 2014/0112038 A1 Apr. 24, 2014

Related U.S. Application Data

(63) Continuation of application No. PCT/EP2011/060927, filed on Jun. 29, 2011.

(51) Int. Cl.
*H02M 7/5387* (2007.01)
*H02H 3/20* (2006.01)
(Continued)

(52) U.S. Cl.
CPC . *H02H 3/20* (2013.01); *H02M 1/32* (2013.01); *H02M 7/483* (2013.01); *H02M 7/53871* (2013.01); *H02M 2001/325* (2013.01); *H02M 2007/4835* (2013.01)

(58) Field of Classification Search
CPC .......... H02M 7/42; H02M 7/44; H02M 7/48; H02M 7/483; H02M 7/49; H02M 7/5387; H02M 2007/4835; H02M 1/32; H02M 2001/322; H02M 2001/325

USPC ............ 363/16–17, 35, 37–43, 50–55, 363/56.01–56.05, 95–98, 123, 125, 127, 363/131–132, 135–136
See application file for complete search history.

(56) References Cited

U.S. PATENT DOCUMENTS

| | | | |
|---|---|---|---|
| 6,229,722 B1 | 5/2001 | Ichikawa et al. | |
| 6,292,379 B1 * | 9/2001 | Edevold et al. | 363/71 |
| 6,947,270 B2 | 9/2005 | Gruening | |

(Continued)

FOREIGN PATENT DOCUMENTS

| | | | | |
|---|---|---|---|---|
| WO | WO 2010127699 A1 * | 11/2010 | | H02M 7/49 |
| WO | 2010145688 A1 | 12/2010 | | |

(Continued)

OTHER PUBLICATIONS

Ming-lei Zhu, et al.; "A novel method for improving the fault tolerance of transformerless cascade PWM STATCOM"; Electrical Machines and Systems, 2008. ICEMS 2008. pp. 1990-1994.

(Continued)

*Primary Examiner* — Timothy J Dole
*Assistant Examiner* — Ivan Laboy Andino
(74) *Attorney, Agent, or Firm* — Whitmyer IP Group LLC

(57) ABSTRACT

A method in a controller for protection of a voltage source converter including one or more phases, each phase including one or more series-connected converter cells. Each converter cell has a by-pass switch for enabling by-pass thereof. The method includes the steps of detecting an over-voltage condition, and controlling simultaneously the by-pass switches of each converter cell, so as to bypass the converter cells upon detection of such over-voltage condition. The invention also encompasses a controller, computer programs and computer program products.

8 Claims, 4 Drawing Sheets

(51) Int. Cl.
*H02M 1/32* (2007.01)
*H02M 7/483* (2007.01)

(56) References Cited

U.S. PATENT DOCUMENTS

2010/0066174 A1* 3/2010 Dommaschk et al. ........... 307/75
2012/0063181 A1* 3/2012 Chimento et al. ......... 363/56.03

FOREIGN PATENT DOCUMENTS

| WO | 2011023237 A1 | 3/2011 | |
|---|---|---|---|
| WO | WO 2011113492 A1 * | 9/2011 | .............. H02M 1/32 |

OTHER PUBLICATIONS

Da-liang Yang, Zi-guang Lu, Nai-shan Hang, "Development of ±50kvar DSP-Controlled PWM VSC-Based DSTATCOM with Direct Current Control," appeec, pp. 1-5, 2011 Asia-Pacific Power and Energy Engineering Conference, 2011.

International Search Report and Written Opinion of the International Searching Authority Application No. PCT/EP2011/060927 Completed: May 23, 2012; Mailing Date: Jun. 6, 2012 13 pages.

Candelaria, J, et al.; "VSC-HVDC system protection: A review of current methods"; Power Systems Conference and Exposition (PSCE), 2011 IEEE/PES; Mar. 20-23, 2011; pp. 1-7.

* cited by examiner

METHOD AND CONTROLLER FOR PROTECTING A VOLTAGE SOURCE CONVERTER

FIELD OF THE INVENTION

The invention relates generally to the field of high voltage devices, and in particular to protection of voltage source converters.

BACKGROUND OF THE INVENTION

Voltage Source Converters (VSC), also denoted STATCOM, are today a valuable solution for enhancing power quality of electrical power grids and e.g. for assuring compliance with various requirements in case of integration of stochastic power generation, such as wind power and solar power. A most challenging requirement is the capability of these plants and of the voltage source converters to ride through low or high voltage transients, without tripping voltage breakers and while assuring the grid stability.

Authorities of various countries or regions stipulate various requirements, usually denoted Grid Codes. Riding through of the mentioned low or high voltage transients is typically to not loose active and/or reactive power support during grid faults and especially at fault recovery, when the grid needs the most from compensation equipment such as VSCs.

During a high voltage situation the VSC may experience high electrical stresses (be overloaded) and the requirement of riding through the fault and be controllable after fault recovery may require significant higher equipment costs due to e.g. over-dimensioning of components of the VSC. In particular, the controlled switching of semiconductors of the VSC needs to be blocked upon the DC voltage reaching semiconductor's limit for Switching Safe Operating Area (SSOA), thus reducing the VSC phase to a rectifier type of circuit. DC capacitors of the VSC are then charged by incoming current due to the transient AC overvoltage, thus handling the overvoltage situation.

Today's solutions to the problem are mainly addressed to the conservative design of the VSC, by over-dimensioning the DC capacitors and/or by connecting extra series-connected converter levels in each converter phase. Moreover, DC voltage clamping devices (choppers) may be used at each converter cell of the VSC. All such solutions entail extra costs. Moreover, the VSC is normally blocked for voltage levels typically above 1.4 per unit the nominal bus voltage, eliminating during these blocking periods, the possibility to actively reduce the grid overvoltage. Further, the blocking of the VSC at such high voltage situations entails the risk of individual converter cells exploding, which is costly and possibly dangerous.

In transmission and distribution systems, due to the switching events or resonance conditions, the AC voltage may reach high levels, typically up to 2 per unit the nominal system voltage for short time intervals, typically up to 3 electric periods.

SUMMARY OF THE INVENTION

In view of the above, it is an object of the invention to provide devices and methods for enabling a voltage source converter to handle high voltage transients without introducing additional equipment costs.

The object is according to a first aspect of the invention achieved by a method in a controller for protection of a voltage source converter comprising one or more phases, each phase comprising one or more series-connected converter cells. Each converter cell comprises a by-pass switch for enabling by-pass thereof. The method comprises the steps of: detecting an over-voltage condition; and controlling simultaneously the by-pass switches of each converter cell so as to bypass the converter cells upon detection of such over-voltage condition.

By means of the invention, and in contrary to prior art, the voltage source converter does not need to be over-dimensioned in order to be able to handle high voltage transients. The inventive operation mode does not require over-dimensioning of system apparatuses since inductive over current absorbed by the phase reactors is below the short-circuit current for which they are normally designed, for example during up to 1 second. The inventive method thus enables compliance with stringent overvoltage requirements put by authorities, without increased costs. Further, the invention enables the possibility to actively reduce the power grid overvoltage during such overvoltage conditions, protecting other devices such as wind turbine generators and converters, fixed passive filter banks and auxiliary power supply equipment.

In an embodiment, the voltage source converter comprises three phases being delta connected. The method comprises the further step of controlling and reducing a current in the delta connected voltage source converter prior to the step of controlling simultaneously the by-pass switches, i.e. before activating the by-pass. This step may be introduced in order to eliminate possible unsymmetrical current components or DC current components which may persist in the passive operation mode and making the by-pass problematic.

The object is according to a second aspect of the invention achieved by a controller for controlling a voltage source converter comprising one or more phases, each phase comprising one or more series-connected converter cells. Each converter cell comprises a by-pass switch for enabling by-pass thereof. The controller comprises a processor arranged to: detect an over-voltage condition, and to control simultaneously the by-pass switches of each converter cell so as to bypass the converter cells upon detection of such over-voltage condition.

The object is according to a third aspect of the invention achieved by a computer program for a controller controlling a voltage source converter comprising one or more phases, each phase comprising one or more series-connected converter cells, each converter cell comprising a by-pass switch for enabling by-pass thereof. The computer program comprises computer program code, which, when run on the controller, causes the controller to perform the steps of: detecting an over-voltage condition, and controlling simultaneously the by-pass switches of each converter cell so as to bypass the converter cells upon detection of such over-voltage condition.

The object is according to a fourth aspect of the invention achieved by a computer program product comprising a computer program as above, and a computer readable means on which the computer program is stored.

Further features and advantages of the invention will become clear upon reading the following description and the accompanying drawings.

DETAILED DESCRIPTION OF THE INVENTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail. Like numbers refer to like elements throughout the description.

Figure 1:
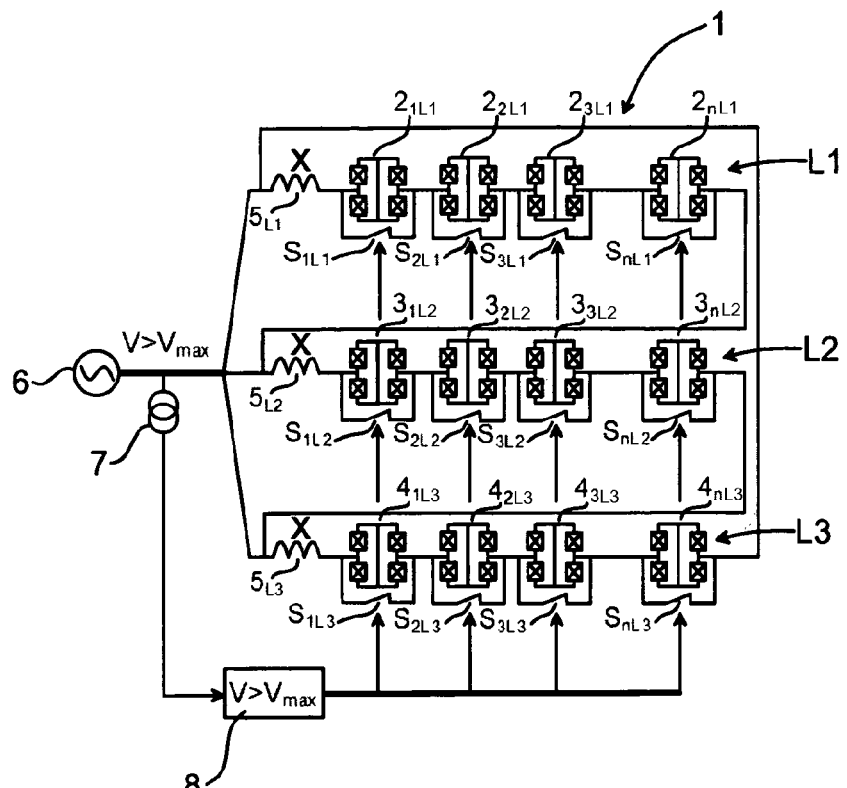
FIG. 1 illustrates schematically an environment in which embodiments of the invention may be implemented, and in particular a multilevel voltage source converter.

FIG. 1 illustrates a voltage source converter 1 for which aspects of the invention may be implemented. The voltage source converter 1 comprises one or more phases; three phases in the illustrated case: L1, L2, L3. Each phase comprises one or more series-connected converter cells, e.g. phase L1 comprises converter cells $2_{1L1}, 2_{2L1}, \ldots 2_{nL1}$; phase L2 comprises converter cells $3_{1L2}, 3_{2L2}, \ldots, 3_{nL2}$; and phase L3 comprises converter cells $4_{1L3}, 4_{2L3}, \ldots, 4_{nL3}$. Each converter cell in turn may comprise four valves (only schematically illustrated) connected in an H-bridge arrangement with a capacitor unit (not shown). Each valve in turn comprises a transistor switch, such as an IGBT (Insulated Gate Bipolar Transistor), having a free-wheeling diode connected in parallel thereto. It is noted that other semiconductor devices could be used, e.g. gate turn-off thyristors (GTO) or Integrated Gate-Commutated Thyristors (IGCT). The converter cells could alternatively be half-bridge converter cells, and it is noted that yet other converter topologies could benefit from the present invention.

The phases L1, L2, L3 are typically connected to an electrical power grid 6, e.g. a three-phase power grid, via a respective phase reactor $5_{L1}, 5_{L2}, 5_{L3}$.

Each converter cell further comprises a bypass switch, $S_{1L1}, S_{2L1}, \ldots, S_{nL1}$ for the phase L1; $S_{1L2}, S_{2L2}, \ldots, S_{nL2}$ for the phase L2 and $S_{1L3}, S_{2L3}, \ldots, S_{nL3}$ for the phase L3. The bypass switches can be any conventional switches used for protecting the single converter cell from overvoltage and/or overcurrent. Examples of such bypass switches comprise switches of thyristor type, IBGT type or mechanical type.

A controller 8 arranged to control the voltage source converter 1 is also provided. The controller 8 receives measurement values e.g. from within the electrical power grid 6, e.g. by means of voltage transformers 7. The controller 8 communicates control signals to the converter cells in conventional manner, for example over a communication network.

In accordance with the invention, use is made of the by-pass switches of each converter cell. A controller 8 controlling the voltage source converter 1 is arranged to achieve a simultaneous by-pass of the complete three-phase voltage source converter 1. In the protection strategy of the voltage source converter 1, a simultaneous by-pass of the converter cells is implemented, e.g. when the AC or DC voltage exceeds the maximum operating value.

Figure 2:
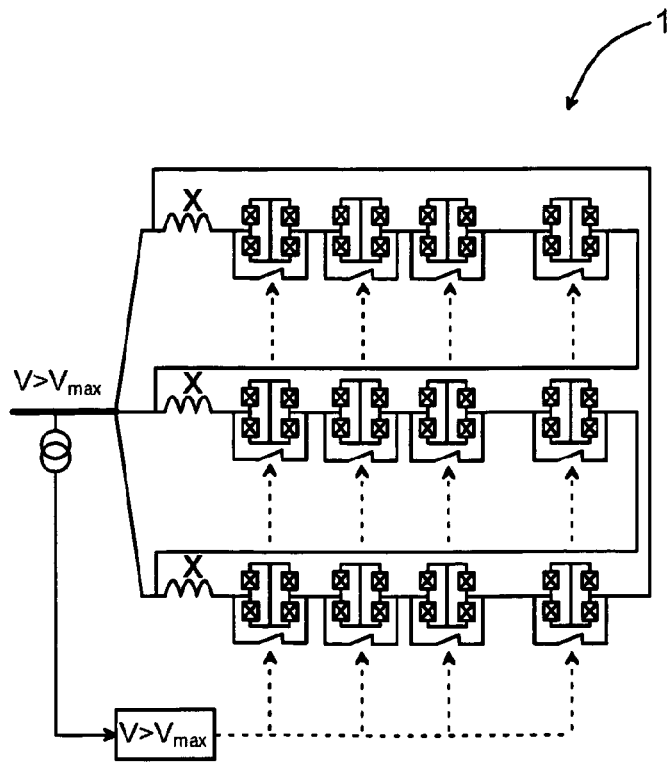
FIG. 2 illustrates the voltage source converter of FIG. 1, with bypass switches in closed positions.

A delta connected voltage source converter structure, as illustrated in FIGS. 1 and 2, becomes, in this way, a symmetric inductive load (reactors $5_{L1}, 5_{L2}, 5_{L3}$, see FIG. 4) which will absorb several per units (e.g. 4-10 per unit) of the nominal current of the voltage source converter 1.

In this operating mode the converter cells are protected against DC overvoltage, and at the same time the grid voltage is automatically reduced thanks to the high inductive load. The voltage source converter 1 can then temporarily operate in a passive mode as shown by the VI curve in FIG. 7 without overloading any converter component.

When the grid voltage is below the maximum operating voltage, the by-pass of the converter cells may be released and the voltage source converter can start again to operate in normal controllable mode.

Figure 3:
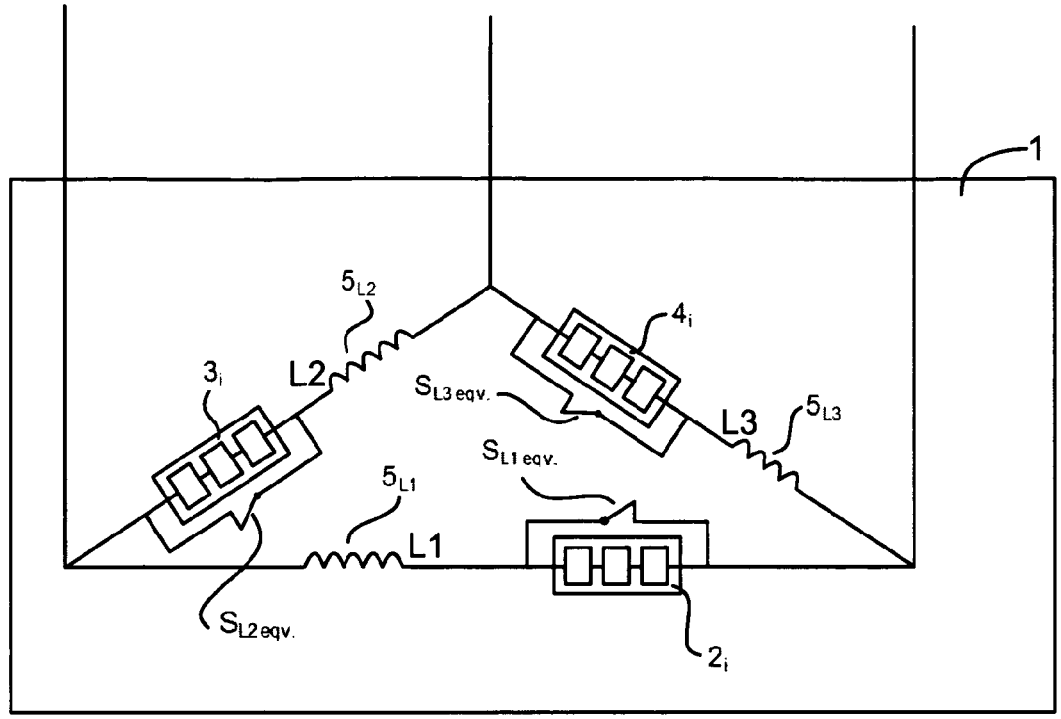
FIG. 3 is another illustration of the voltage source converter of FIG. 1, and in particular an equivalent bypass switch.

The bypass switches $S_{1L1}, S_{2L1}, \ldots, S_{nL1}$; $S_{1L2}, S_{2L2}, \ldots, S_{nL2}$ $S_{1L3}, S_{2L3}, \ldots, S_{nL3}$, illustrated in FIG. 1 in their closed position, are thus simultaneously opened upon a certain criterion being fulfilled (e.g. AC voltage exceeding maximum operating value). The bypass switches of a phase can be seen as a single switch, as illustrated in FIG. 3. That is, for phase L1, the bypass switches $S_{1L1}, S_{2L1}, \ldots, S_{nL1}$ can be equaled with a switch $S_{L1eqv}$ bypassing the whole phase leg, likewise for phase L2, the bypass switches $S_{1L2}, S_{2L2}, \ldots, S_{nL2}$ can be equaled with a switch $S_{L2eqv}$ bypassing the whole phase leg for phase L2, the bypass switches $S_{1L3}, S_{2L3}, \ldots, S_{nL3}$ can be equaled with a switch $S_{L3eqv}$ bypassing the whole phase leg L3.

Figure 4:
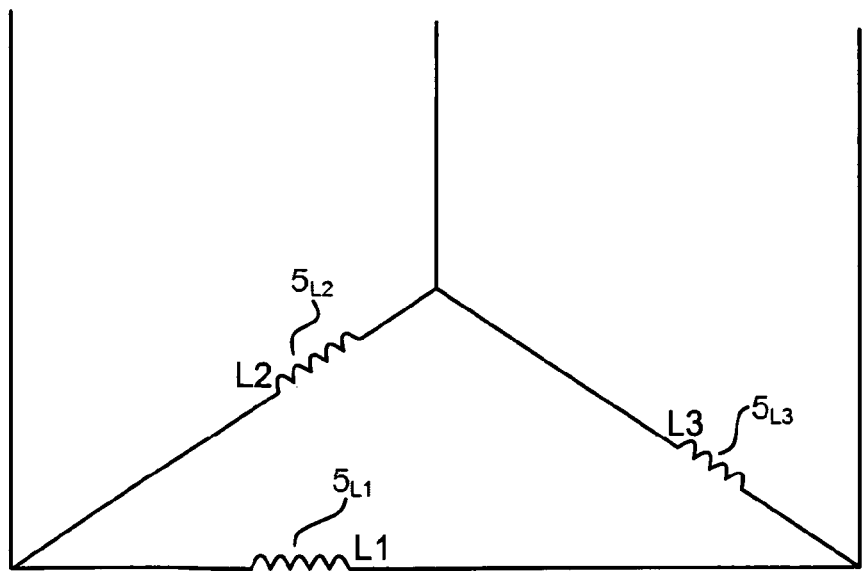
FIG. 4 is another illustration of the voltage source converter of FIG. 2, illustrating the passive mode.

FIG. 3 illustrates the voltage source converter 1 with the bypass switched in their closed position, thus short-circuiting the converter cells. FIG. 4 also illustrates this case, i.e. when the bypass switches have been controlled so at to be in their closed position, and as mentioned earlier, the voltage source converter 1 then becomes a symmetric inductive load.

Figure 5:
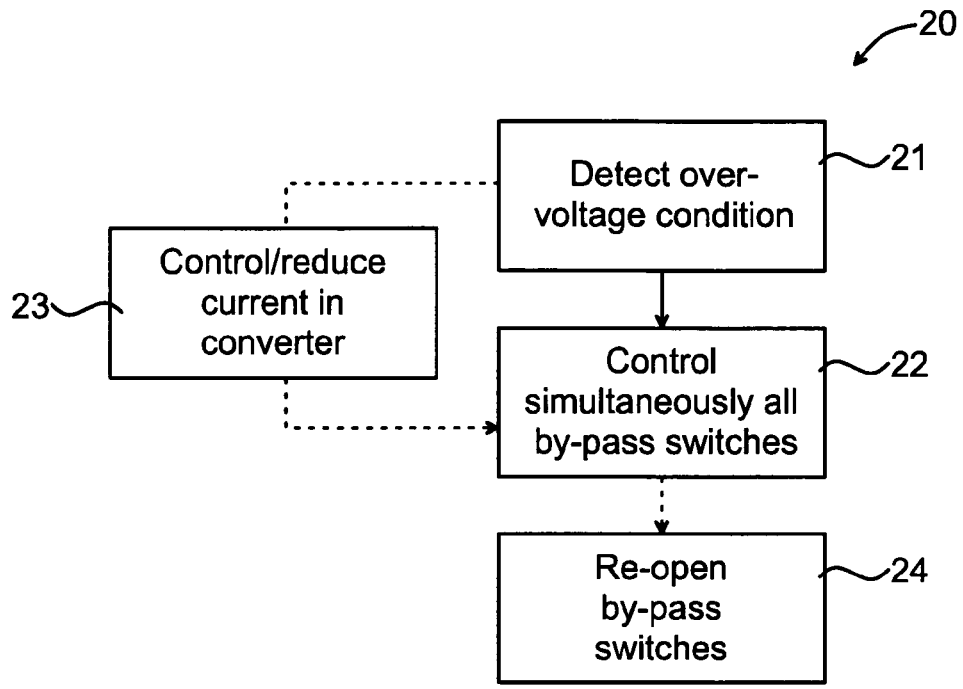
FIG. 5 illustrates a flow chart over steps of a method in accordance with an aspect of the invention.

In an aspect and with reference to FIG. 5, the invention provides a method 20 in a controller 8 for protection of the described voltage source converter 1. The voltage source converter 1 comprises one or more phases L1, L2, L3, each phase L1, L2, L3 comprising one or more series-connected converter cells $2_{1L1}, 2_{2L1}, \ldots, 2_{nL1}; 3_{1L2}, 3_{2L2}, \ldots, 3_{nL2}; 4_{1L3}, 4_{2L3}, \ldots, 4_{nL3}$. Each converter cell comprises a by-pass switch $S_{1L1}, S_{2L1}, \ldots, S_{nL1}; S_{1L2}, S_{2L2}, \ldots, S_{nL2}; S_{1L3}, S_{2L3}, \ldots, S_{nL3}$ for enabling by-pass thereof.

The method 20 comprises the first step of detecting 21 an over-voltage condition. The overvoltage condition may be detected by measuring an AC voltage of the power grid 6 to which the voltage source converter 1 is connected and determining that this AC voltage exceeds a maximum operation voltage of the voltage source converter 1, and/or measuring a DC voltage of the one or more converter cells $2_{1L1}, 2_{2L1}, \ldots, 2_{nL1}; 3_{1L2}, 3_{2L2}, \ldots, 3_{nL2}; 4_{1L3}, 4_{2L3}, \ldots, 4_{nL3}$ and determining that this DC voltage exceeds a preset value, and/or measuring the AC current and detecting a current which exceed a preset value as consequence of a high AC voltage detected in the same time, and/or measuring a current in the one or more phases L1, L2, L3 and determining this current to exceed a preset value.

The method 20 comprises the second step of controlling 22 simultaneously the by-pass switches $S_{1L1}, S_{2L1}, \ldots, S_{nL1}$; $S_{1L2}, S_{2L2}, \ldots, S_{nL2}; S_{1L3}, S_{2L3}, \ldots, S_{nL3}$ of each converter cell $2_{1L1}, 2_{2L1}, \ldots, 2_{nL1}; 3_{1L2}, 3_{2L2}, \ldots, 3_{nL2}; 4_{1L3}, 4_{2L3}, \ldots, 4_{nL3}$ so as to bypass the converter cells $2_{1L1}, 2_{2L1}, \ldots, 2_{nL1}; 3_{1L2}, 3_{2L2}, \ldots, 3_{nL2}; 4_{1L3}, 4_{2L3}, \ldots, 4_{nL3}$ upon detection of such over-voltage condition. This may be accomplished for example by sending control signals from the controller 8 for closing the by-pass switches.

In an embodiment, wherein the voltage source converter 1 comprises three phases L1, L2, L3 that are delta connected, each phase further comprising a respective phase reactor $5_{L1}$, $5_{L2}$, $5_{L3}$, the method 20 may comprise the further step of controlling 23 and reducing a current in the delta connected voltage source converter 1 prior to the step of controlling 22 simultaneously the by-pass switches. This is done in order to eliminate possible unsymmetrical current components or DC current components which may persist in the passive operation mode and harm or render difficult any bypass switch re-opening.

In an embodiment, the voltage source converter 1 enters a passive mode upon the converter cells $2_{1L1}, 2_{2L1}, \ldots, 2_{nL1}$; $3_{1L2}, 3_{2L2}, \ldots, 3_{nL2}$; $4_{1L3}, 4_{2L3}, \ldots, 4_{nL3}$ being bypassed. In this passive mode a respective phase reactor $5_{L1}, 5_{L2}, 5_{L3}$ of the one or more phases L1, L2, L3 absorbs inductive overcurrent caused by the detected overvoltage condition.

In an embodiment, the method 20 comprises the further step of re-opening 24 the bypass switches $S_{1L1}, S_{2L1}, \ldots, S_{nL1}$; $S_{1L2}, S_{2L2}, \ldots, S_{nL2}$; $S_{1L3}, S_{2L3}, \ldots, S_{nL3}$ when the detected overvoltage condition has passed. This is accomplished by sending control signals from the controller 8, for opening the bypass switches and thus putting the voltage source converter 1 in operable mode again.

Figure 6:
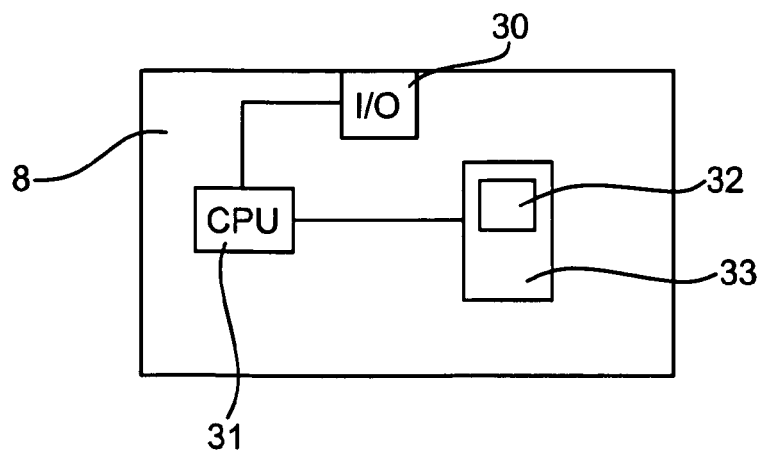
FIG. 6 illustrates a controller and means for implementing the inventive method.

FIG. 6 illustrates means for implementing the methods as described, and in particular the controller 8 for controlling a voltage source converter 1 as described. The controller 8 comprises a processor 31 arranged to:

detect an over-voltage condition, and to control simultaneously the by-pass switches $S_{1L1}, S_{2L1}, \ldots, S_{nL1}$; $S_{1L2}, S_{2L2}, \ldots, S_{nL2}$; $S_{1L3}, S_{2L3}, \ldots, S_{nL3}$ of each converter cell $2_{1L1}, 2_{2L1}, \ldots, 2_{nL1}$; $3_{1L2}, 3_{2L2}, \ldots, 3_{nL2}$; $4_{1L3}, 4_{2L3}, \ldots, 4_{nL3}$ so as to bypass the converter cells $2_{1L1}, 2_{2L1}, \ldots, 2_{nL1}$; $3_{1L2}, 3_{2L2}, \ldots, 3_{nL2}$; $4_{1L3}, 4_{2L3}, \ldots, 4_{nL3}$ upon detection of such over-voltage condition.

The controller 8 comprises a processor 31, e.g. a central processing unit, microcontroller, digital signal processor (DSP), etc., capable of executing software instructions stored in a computer program product 33 e.g. in the form of a memory. The processor 31 is connected to an input device 30, that receives inputs e.g. from converter cell control and protection units (not illustrated) connected to gate units of the converter cells. It is noted that although only one processor 31 is illustrated in FIG. 6, the implementation may comprise distributed hardware so that several CPUs are used rather than one when running the software. Likewise, although only one input device 30 is illustrated, there may be several input devices.

The described methods and algorithms or parts thereof for controlling the voltage source converter 1 may be implemented e.g. by software and/or application specific integrated circuits in the processor 31. To this end, the controller 8 may further comprise a computer program 32 stored on the computer program product 32.

With reference still to FIG. 6, the invention also encompasses such computer program 32 for controlling the voltage source converter 1. The computer program 32 comprises computer program code which when run on the controller 8, and in particular the processor 31 thereof, causes the controller 8 to perform the methods as described.

A computer program product 33 is thus also provided comprising the computer program 32 and computer readable means on which the computer program 32 is stored. The computer program product 33 can be any combination of read and write memory (RAM) or read only memory (ROM). The computer program product 33 may also comprise persistent storage, which, for example can be any single one or combination of magnetic memory, optical memory, or solid state memory.

Figure 7:
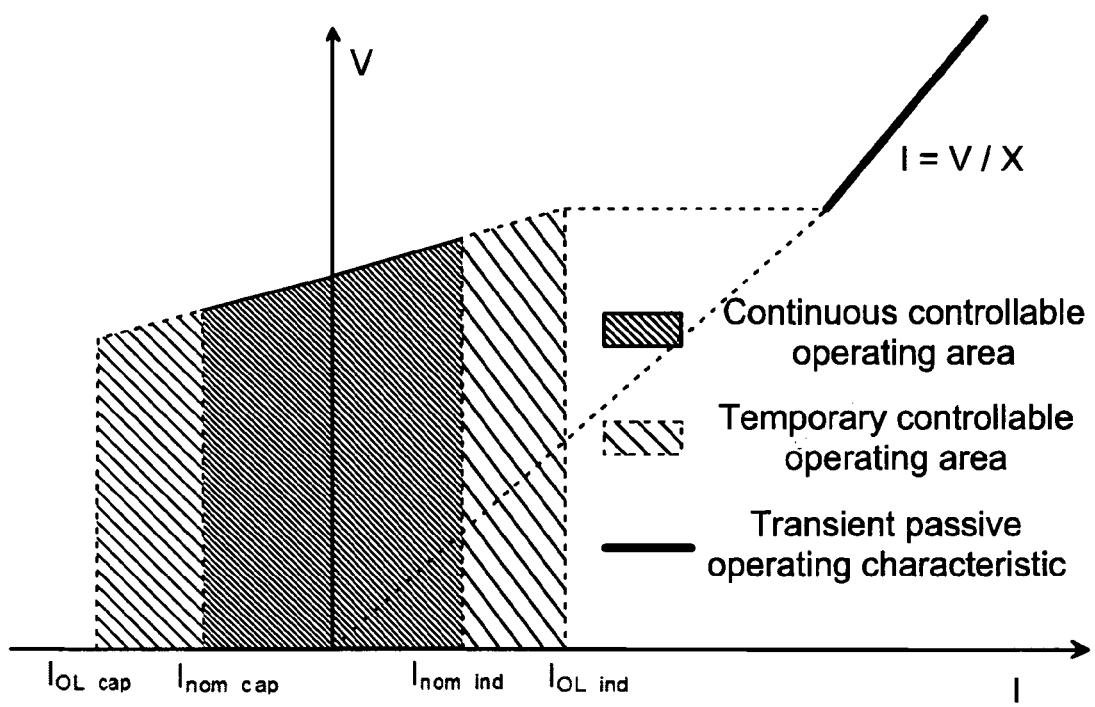
FIG. 7 illustrates VI characteristics of the voltage source converter in normal operation, in overload operation and in inventive passive mode operation.

FIG. 7 illustrates VI characteristics of the voltage source converter. In particular, the voltage source converter is illustrated in normal operation, in overload operation (in which it is still fully controllable) and in the passive mode operation in accordance with one aspect of the invention, in the figure, the controllable operating range of the converter is presented, showing the behavior of the grid voltage against reactive current during continuous (between $I_{nom\ cap}$ and $I_{nom\ ind}$) and temporary ($I_{OL\ cap}$ and $I_{OL\ ind}$), typically few seconds conditions. Operation outside these ranges cause the blocking of the converter and in extreme cases the disconnection from the grid. An aspect of the invention adds a transient operating characteristic seen by the grid, where the converter is transiently bypassed and the VI characteristic seen by the grid assumes the characteristic of a reactor, helping on the system ride-through overvoltage conditions.

In summary, the invention makes use of existing equipment (by-pass device at single converter cell) for achieving a new system configuration under extreme overvoltage conditions. A novel feature is the passive operating mode, achieved by coordination of the by-pass devices through the voltage source converter central controller. The new operation mode enables compliance with various requirements which normally would lead to extra cost on the equipment and, at same time, offers the possibility to actively reduce the power grid voltage, protecting other devices such as wind turbine generators and converters, fixed passive filter banks and auxiliary power supply equipment. The new operation mode does not require over-dimensioning of system apparatus since the inductive over-current absorbed by the phase reactors is usually below the short-circuit current for which they are normally designed.

What is claimed is:

1. A method in a controller for protection of a voltage source converter comprising three phases connected in delta connection, each phase comprising two or more series-connected converter cells and a respective phase reactor, each converter cell comprising a half-bridge converter cell or a full converter cell, further each converter cell having a by-pass switch connected in parallel with the respective converter cell for enabling by-pass thereof, the method comprising the steps of:

detecting an over-voltage condition, wherein the step of detecting the over-voltage condition comprises measuring an AC voltage of a power grid to which the voltage source converter is connected and determining this AC voltage to exceed a maximum operation voltage of the voltage source converter, and/or measuring a DC voltage of the one or more converter cells and determining this DC voltage to exceed a preset value, and/or measuring a current in the one or more phases and determining this current to exceed a preset value, and controlling simultaneously the by-pass switches of each converter cell to be configured in closed position so as to short-circuit the converter cells and by-pass the converter cells upon detection of the over-voltage condition, wherein the voltage source converter enters a passive mode upon the converter cells being by-passed, in which in the passive mode the respective phase reactor of each of the three phases absorbs inductive overcurrent caused by the detected overvoltage condition.

2. The method as claimed in claim 1, comprising the further step of controlling a current in the delta connected voltage source converter prior to the step of controlling simultaneously the by-pass switches.

3. The method as claimed in claim 1, wherein the step of controlling the by-pass switches comprises sending control signals for closing the by-pass switches.

4. The method as claimed in claim 1, comprising the further step of re-opening the by-pass switches when the detected overvoltage condition has passed.

5. The method as claimed in claim 1, wherein the by-pass switches comprises thyristor based by-pass switches, insulated gate bipolar transistor based by-pass switches, or mechanical by-pass switches.

6. A controller for controlling a voltage source converter comprising three phases connected in delta connection, each phase comprising two or more series-connected converter cells and a respective phase reactor, each converter cell comprising a half-bridge converter cell or a full converter cell, further each converter cell having a by-pass switch connected in parallel with the respective converter cell for enabling by-pass thereof, the controller comprising a processor arranged to:
  detect an over-voltage condition, wherein detecting the over-voltage condition comprises measuring an AC voltage of a power grid to which the voltage source converter is connected and determining this AC voltage to exceed a maximum operation voltage of the voltage source converter, and/or measuring a DC voltage of the one or more converter cells and determining this DC voltage to exceed a preset value, and/or measuring a current in the one or more phases and determining this current to exceed a preset value, and to
  control simultaneously the by-pass switches of each converter cell to be configured in closed position so as to short-circuit the converter cells and by-pass the converter cells upon detection of the over-voltage condition, wherein the voltage source converter enters a passive mode upon the converter cells being by-passed, in which in the passive mode the respective phase reactor of each of the three phases absorbs inductive overcurrent caused by the detected overvoltage condition.

7. A computer program for a controller controlling a voltage source converter comprising three phases connected in delta connection, each phase comprising two or more series-connected converter cells and a respective phase reactor, each converter cell comprising a half-bridge converter cell or a full converter cell, further each converter cell having a by-pass switch connected in parallel with the respective converter cell for enabling by-pass thereof, the computer program comprising computer program code, which, when run on the controller, causes the controller to perform the steps of:
  detecting an over-voltage condition, wherein the step of detecting the over-voltage condition comprises measuring an AC voltage of a power grid to which the voltage source converter is connected and determining this AC voltage to exceed a maximum operation voltage of the voltage source converter, and/or measuring a DC voltage of the one or more converter cells and determining this DC voltage to exceed a preset value, and/or measuring a current in the one or more phases and determining this current to exceed a preset value, and
  controlling simultaneously the by-pass switches of each converter cell to be configured in closed position so as to short-circuit the converter cells and by-pass the converter cells upon detection of the over-voltage condition, wherein the voltage source converter enters a passive mode upon the converter cells being by-passed, in which in the passive mode the respective phase reactor of each of the three phases absorbs inductive overcurrent caused by the detected overvoltage condition.

8. A computer program product comprising a non-transitory computer readable medium storing the computer program of claim 7.

* * * * *